April 12, 1966   J. L. ROMSTADT   3,245,376
PROCESS AND APPARATUS FOR FILMING IRREGULAR SHAPED OBJECTS
Filed Jan. 2, 1962
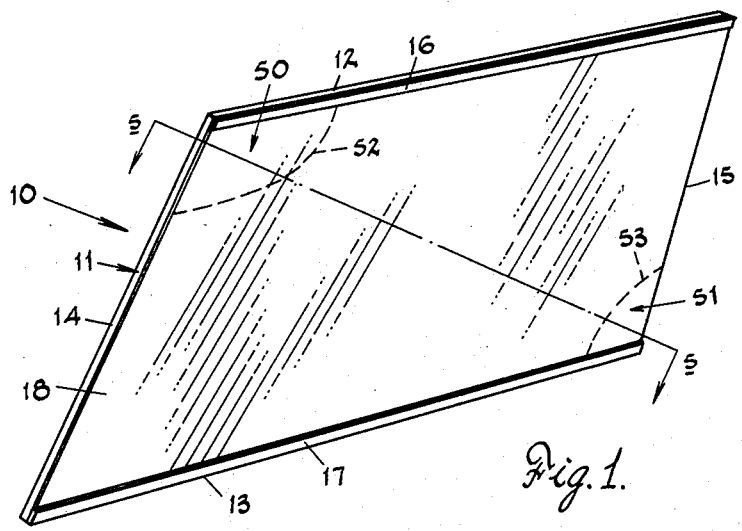
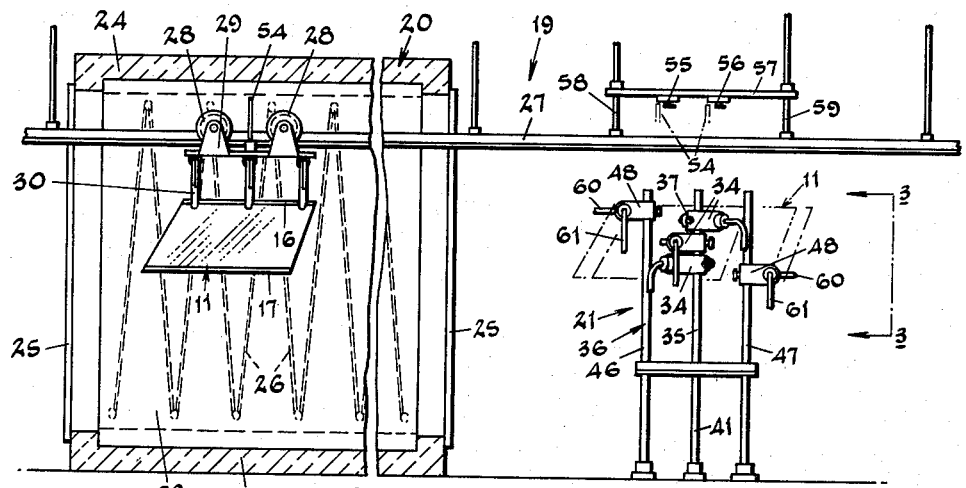
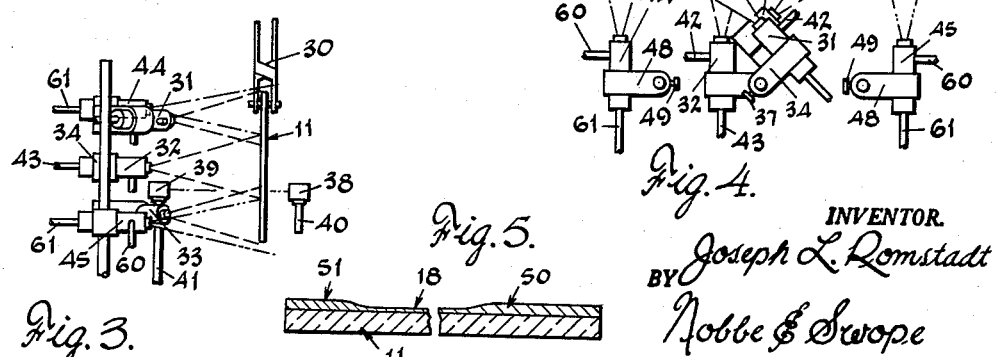
INVENTOR.
Joseph L. Romstadt
BY
Nobbe & Swope
ATTORNEYS

United States Patent Office 3,245,376
Patented Apr. 12, 1966

3,245,376
PROCESS AND APPARATUS FOR FILMING IRREGULAR SHAPED OBJECTS
Joseph L. Romstadt, Toledo, Ohio, assignor to Libbey-Owens-Ford Glass Company, Toledo, Ohio, a corporation of Ohio
Filed Jan. 2, 1962, Ser. No. 163,565
1 Claim. (Cl. 118—2)

This invention relates broadly to a process and apparatus for producing a film or coating on a surface, and more particularly relates to an improved continuous process for providing an electrically conducting transport film on glass or other vitreous objects of irregular outline, which film is effective to provide a uniform heat output over one entire surface of such objects.

Transparent, substantially colorless electrically conducting films heretofore have been produced commercially by the reaction, for example, of a tin halide in solution form on glass heated to substantially its point of softening. As is known in the art, such films are provided between and in electrical contact with spaced electrodes on a surface of glass sheet whereby, when an electric potential is applied to the electrodes, the film acts as a resistance element and becomes heated. However, for the film to be uniformly heated and thus free from extremely detrimental hot spots, it was necessary that it be applied as a band of uniform width extending between electrodes of uniform length; thus, square or rectangular areas were usually filmed.

In brief explanation of the above, it will be appreciated that where electrodes are not spaced an equal distance from each other throughout their length, objectionable nonuniform heating of the glass results because the electrical energy seeks the shortest path from electrode to electrode through the film, thus creating overheated areas where the electrodes are closest together and relatively cool areas where the electrodes are farthest apart. Further, when one electrode or bus bar of a pair, whether parallel or not, is longer than the other, the density of current flow and consequently the heat generation tends to be highest at the ends of the shortest bus bar. Additionally, in the case of a nonrectangular viewing closure having, for example, the shape of a parallelogram, even though the electrodes are substantially parallel and equal in length, the density of current flow tends to be highest at the terminus of the electrode which is perpendicular across from the opposed electrode, and consequently a large amount of current may flow to an electrode at one point or area along its length and a relatively lower amount of current may flow to the bus bar at another point or area along its length.

Now, it will be appreciated that in the majority of aircraft glazings, lights of an irregular shape, e.g. a rhomboid, rhombus or trapezoid are encountered where substantial portions of the lights are not filmed and therefore made resistant to icing or fogging when only a square or rectangular area is filmed. Up to the present time, this procedure was accepted to the aircraft industries in general; however, recent specifications have called for the entire light, even though of irregular shape, to be provided with an electrically conductive film.

It is, therefore, a principal object of the present invention to provide a continuous process for depositing transparent, electrically conducting films of uniform heat output on glass or other vitreous objects of irregular shape.

Another object of the invention is the provision of an apparatus capable of continuous application of an electrically conducting film of uniform heat output on irregular shaped surfaces, while such surfaces are conveyed along a predetermined path.

More particularly, it is a further object of the invention to provide a method of filming irregular shaped, glass viewing closures wherein a film-forming solution is sprayed uniformly over the entire surface of the closure and an additional quantity of filming solution is substantially simultaneously directed against preselected portions only of such surface, these preselected portions being areas in which film failure normally would occur during service due to excessive heat output therein.

Other objects and advantages of the invention will become more apparent during the course of the following description when taken in connection with the accompanying drawings.

In the drawings, wherein like numerals are employed to designate parts throughout the same:

FIG. 1 is a perspective view of an electrically conducting glazing unit produced in accordance with the present invention;

FIG. 2 is a broken, side elevational view partially in section depicting an apparatus constructed in accordance with the invention and especially adapted for producing the filmed unit of FIG. 1;

FIG. 3 is an enlarged view of the filming apparatus taken along the line 3—3 of FIG. 2;

FIG. 4 is an enlarged plan view of the filming apparatus illustrated in FIGS. 2 and 3; and FIG. 5 is a broken cross sectional view taken along the line 5—5 of FIG. 1.

Briefly stated, the present invention provides a continuous method for filming a surface of a glass sheet having an irregular outline which includes the steps of conveying such surface, while at an elevated temperature, along a predetermined path, directing a first quantity or spray of film-forming material uniformly over said surface as it moves along said path, and substantially simultaneously directing at least one additional spray of film-forming material against a preselected portion only of said surface to provide a buildup or thickened area of film on said preselected portion. In addition, the apparatus according to the invention includes a filming station comprisig a plurality or bank of spray guns located on one side of the path of travel of the sheet, a portion of guns collectively being adapted to emit a film-forming solution uniformly over one entire surface of the sheet during movement thereof relative to the guns, while another portion of the spray guns is adapted to direct a film-forming solution towards certain areas only of the sheet surface. Preferably, the filming station includes means responsive to the movement of the sheet along its path of travel for activating the spray guns.

Referring now more particularly to the drawings, there is illustrated in FIG. 1 a filmed, transparent electrically conducting panel produced in accordance with the present invention and indicated generally by the numeral 10. In the particular embodiment illustrated, the panel 10 comprises a glass sheet 11 having the outline of a trapezoid with the longitudinal edges 12 and 13 being parallel and the transverse edges 14 and 15 being non-parallel. In this connection also, the edge 13 is longer than the edge 12 whereby the intersection of the edges 12 and 14 as well as that of the edges 13 and 15 define obtuse angles while the intersections of edge 12 with edge 15 and edge 13 with edge 14 define actuate angles.

A pair of electrodes 16 and 17 are disposed along the longitudinal edges 12 and 13, respectively, of the panel and may suitably comprise a fired silver frit as is conventional with transparent electrically conducting panels of this type, the frit normally being applied as a slurry and fired at the same time the sheet is heated for the filming operation. In addition, the panel 10 includes on the same major surface of the glass sheet 11 as the electrodes 16 and 17, a transparent, electrically conductive film 18 which is preferably produced by spraying a tin compound, such as tin tetrachloride, on a heated base as hereinafter more fully described.

Now, as previously indicated, when a glass sheet having an irregular outline, such as the sheet 11, is filmed in the usual manner to produce an electrically conducting coating of uniform thickness, "hot spots" or localized areas of overheating are developed. More particularly, and with reference specifically to the sheet 11, severe overheating is produced at those areas immediately adjacent the obtuse angles of the sheet when the same is provided with a uniform film. As above mentioned, this is believed to be caused by the fact that the extremity of either of the electrodes 16 and 17 contiguous these angles is not perpendicularly across from the corresponding extremity of the opposed electrode, such latter extremity being longitudinally outward thereof. Thus, the current flow across or transverse the panel 10 from the portion of the electrodes longitudinally outwardly of the electrode terminals contiguous the obtuse angles is concentrated at such terminals.

Now it has been found that this overheating of the sheet 11 adjacent the obtuse angles thereof may be successfully eliminated by the application of a thicker film to these areas. Thus, the film buildup tends to lower the resistance and therefore significantly reduce the heat generation at these points, the heat generation, of course, being a direct function of the film resistance. While various methods may be employed to buildup or thicken the conductive film at the specific areas where such is needed, known methods have required a discontinuity in the overall filming process which is objectionable both from the time and cost standpoints. Accordingly, the discovery of a continuous method for differentially filming an irregular shaped sheet provides highly beneficial and desirable results.

FIGS. 2, 3 and 4 illustrate one form of filming apparatus constructed in accordance with the invention and particularly adapted to carry out the method thereof, such apparatus being designated in its entirety by the numeral 19. The apparatus 19 essentially includes a heating furnace 20 and a spraying or filming mechanism 21 arranged in substantial end-to-end alignment to act successively on a glass sheet during movement thereof along a definite predetermined path.

The furnace 20 is of the rectangular tunnel-type including side walls, one of which is shown at 22, bottom wall 23 and top wall 24. The furnace is closed at its opposite ends by doors 25 and may be heated in any desired manner such as by means of ribbon-type electrical heaters 26 arranged along the side walls.

In order to convey work, and more particularly the sheet 11, through the furnace 20 and to transfer it from the furnace past the spraying mechanism 21, there is provided a monorail 27 mounted at a predetermined height by any suitable means and extending outwardly from the furnace 20 to and beyond the spraying mechanism 21. Movably mounted on the monorail 27 by wheels 28 is a carriage 29. The glass sheet 11 to be treated is supported or carried by the carriage 29 by means of clips, fingers, tongs, or the like 30, hung from and fixed to the carriage.

The glass sheet 11, after being hung on the carriage 29 at the entrance end of the furnace 20, is introduced into and passed through the furnace by movement of the carriage from left to right along the monorail 27. It should be noted that the particular manner of moving the carriage forms no part of the present invention whereby it may be suitably accomplished by any known drive means, for example, a chain drive mechanism.

The speed of travel of the carriage 29 during treatment of the glass, and the temperatures within the furnace 20, are so controlled that by the time the sheet 11 reaches the exit end of the furnace it has been heated to substantially the softening point of the glass. For example, it has been found that an approximately 3.3 minute heating cycle with the furnace at 1250° F. will bring a one-quarter inch thick sheet of soda-lime-silica ground and polished plate glass within the proper temperature range for the subsequent treatment.

With the glass sheet at the proper temperature, the back door 25 opens and the heated sheet moves therethrough out of the furnace and past the subsequently positioned filming mechanism 21, now to be described.

As shown, the filming or spraying mechanism 21 includes a bank of spray guns, one portion of which, here shown as guns 31, 32 and 33, are mounted in a position to collectively direct a spray of atomized liquid filming material uniformly over one major surface of the glass sheet 11 as it moves therepast. To this end, the spray guns 31, 32 and 33 may be fixedly mounted one on top of the other on brackets 34 which, in turn, are mounted for sliding movement in a vertical plane on a vertically extending rod 35 of a support structure 36 positioned slightly forwardly of the path of travel of the sheet. The brackets 34 are held in a fixed predetermined position on the rod 35 by means of set screws 37. It should be noted that while in the particular embodiment illustrated the lower and upper spray guns 33 and 31 are shown directed toward the leading and trailing edges of the sheet 11, respectively, and the middle spray gun 32 is directed substantially normal to the sheet and the path of movement thereof, the guns 31 and 33 also may be directed normally to the sheet with essentially equivalent results. In this connection, it is only necessary that the guns be positioned such that they provide a film of substantially uniform thickness when acting in unison on the surface of sheet 11 as it is conveyed therepast.

The spray guns 31, 32 and 33 may be manually operated, or preferably, may be automatically activated, for example, upon the leading edge of the sheet interrupting a light beam emanating from a source 38 and directed at a photoelectric cell 39 (FIG. 3), a conventional electric circuit being established between the guns 31, 32 and 33 and the said photoelectric cell. In this respect, the source 38 and photoelectric cell 39 are mounted in substantially the same vertical plane normal to the path of movement of the sheet as the middle spray gun 32, such mounting means suitably comprising the standards 40 and 41, respectively. The photoelectric cell 39 is of a sensitivity such that a small decrease in the amount of light striking same, for example, the decrease of intensity of the beam due to reflection and absorption of a portion of the light by the sheet 11 moving therethrough, will activate the spray guns 31, 32 and 33.

The spray guns 31, 32 and 33 are supplied with atomizing air through conduits 42 leading from a suitable compressed air source (not shown), and with filming solution or liquid through conduits 43 which, in turn, communicate with a liquid supply source (not shown). As previously mentioned, the filming liquid may be composed of any of the materials known to produce electrically conducting films, e.g. metal oxide films, upon contact with a hot glass surface, but in the specific case here described, it is preferred to use a 30 percent solution of tin tetrachloride in isopropyl alcohol. In addition, excellent results have been obtained with the spray guns 31, 32 and 33 positioned in the neighborhood of 20 to 25 inches from the glass sheet surface and delivering approximately 50 to 100 cubic centimeters per second of filming solution under an atomizing air pressure in the range of 20 to 40 pounds per square inch, while the sheet is moving past the guns at approximately 50 to 75 feet per minute. With the use of such a solution and the conditions mentioned above, it is possible to consistently produce a clear, transparent, electrically conducting film having a resistivity in the range of about 25 to 150 ohms per square.

Now, in accordance with the invention, there is provided on either side of the spray guns 31, 32 and 33 auxiliary sprays guns 44 and 45. The spray guns 44 and 45 may be mounted on vertically extending rods 46 and 47 respectively, of the support structure 36 in a manner similar to the guns 31, 32 and 33, that is, the guns 44 and 45 are held by brackets 48 which, in turn, are adjustably secured to the rods 46 and 47 by means of set screws 49. The spray gun 44 is positioned on the rod 46 at a height substantially corresponding to that assumed by the upper edge 12 of the glass sheet 11 during travel thereof past the spray gun 44, while the spray gun 45 is positioned on the rod 47 at a height substantially corresponding to that assumed by the lower edge 13 of the sheet in its path of travel therepast.

In order to activate the spray guns 44 and 45 during the proper time interval to form the film buildup or thickened portions adjacent the obtuse angles of the sheet 11, such thickened portions being indicated generally at 50 and 51 and defined by the dotted lines 52 and 53, a slightly resilient conductor arm 54 is provided on the carriage 29 and extends upwardly therefrom. In addition, a pair of electrical contact switches 55 and 56 are mounted over the filming mechanism 21 on a horizontal bar 57 extending between two support struts 58 and 59 for the monorail 27 at a height approximately that of the upper end of the arm 54. The switches 55 and 56 are electrically connected to the spray guns 44 and 45, respectively, by conventional circuitry and are positioned longitudinally of the path of travel of the sheet 11 such that contact of the arm 54 therewith will occur immediately prior to passage of the sheet surface adjacent the obtuse angles normal to the guns and will cause the guns to be activated. The spray guns 44 and 45 will remain activated for a time interval equal to that required for the arm 54 to slide over each switch, usually just a matter of a few tenths of a second. In this connection, the spray guns 42 and 43 are supplied with atomizing air through the conduits 60, and with film-forming solution through the conduits 61.

In practicing the method of the invention, the sheet 11, after being heated to the proper temperature in the furnace 20, is conveyed along the monorail 27 towards the filming mechanism 21. Upon the leading edge 15 of the sheet 11 diminishing the intensity of the light beam emanating from the light source 38, the spray guns 31, 32 and 33 are automatically activated whereby film-forming solution is directed from each of these guns toward the sheet in the manner indicated schematically in FIGS. 3 and 4. As the sheet continues along its path, and specifically when the areas adjacent the obtuse angles thereof pass normally to the spray guns 44 and 45, which, as will be appreciated, may be either simultaneously or at different time intervals, these guns will be activated by contact of the arm 54 with the switches 55 and 56. Thus, bursts of film-forming material will be directed from the guns 44 and 45 toward those areas whereat it has been found that hot spots develop upon a potential being applied across the sheet.

It will be appreciated that the switches 55 and 56 as well as the auxiliary spray guns 44 and 45 are positioned according to the shape and size of the sheet being filmed which, in turn, determines where the areas of overheating will be located. In the particular embodiment illustrated, due to the shape of the sheet 11, the arm 54 will first contact the switch 55 whereby spray gun 44 will be activated and thereafter will contact the switch 56 whereby the spray gun 45 will be activated. The spray guns 31, 32 and 33 will, of course, continue operation during activation of the guns 44 and 45 thereby causing the built-up or thickened portions 50 and 51 of the film 18 to be formed adjacent the obtuse angles.

Upon the trailing edge 14 of the sheet moving past the spray gun 32, the full intensity of the light beam from the source 38 will again strike the photoelectric cell 39, thereby deactivating the spray guns 31, 32 and 33.

It will thus be seen that the present invention provides a greatly improved process and apparatus for applying an electrically conducting transparent film of differential thickness on one entire surface of a glass or other vitreous object of irregular shape. The present process and apparatus are effective to greatly improve production economies in the formation of electrically conducting films and uniquely accomplish all of the desired objects previously set forth herein.

While the present invention has been particularly described in connection with the formation of an electrically conducting film on a glass sheet having a trapezoidal shape, it is to be understood that it is not limited thereto. Thus, changes in the shape necessitating different locations of film buildup require in the majority of instances only compensating alterations in the specific locations of the auxiliary spray guns 44 and 45 and the switches 55 and 56 for activating the same. Also, while the conditions enumerated above as specific examples in connection with the filming temperatures, filming solution, etc., have been found to provide particularly excellent results, it will be apparent that these may be altered in one way or another as desired without losing the many benefits of the invention.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

In an apparatus for filming a surface of irregular outline, the combination with means for conveying said surface along a predetermined path of a tunnel-type heating furnace arranged in surrounding relation to said path, a first spray means of one or more spray guns arranged at one side of said path beyond said furnace, means for supplying filming fluid to and discharging it from said spray means, means mounting said first spray means to direct said filming fluid discharged therefrom substantially uniformly over the entire area of said surface, a second spray means of one or more spray guns arranged on the same side of said path as said first spray means, means for supplying filming fluid to said second spray means, means mounting said second spray means to direct said filming fluid supplied thereto against preselected portions only of the area of said surface, means responsive to the movement of said surface for activating said second spray means when said preselected portions of said surface are disposed adjacent thereto, and means responsive to the movement of said surface for activating said first spray means.

References Cited by the Examiner

UNITED STATES PATENTS

| | | | |
|---|---|---|---|
| 2,061,107 | 11/1936 | Schellenger | 117—212 |
| 2,557,983 | 6/1951 | Linder | 117—124 |
| 2,648,752 | 8/1953 | Saunders | 117—124 |
| 2,667,428 | 1/1954 | Young et al. | 117—124 |
| 2,675,778 | 4/1954 | Peeps | 118—2 |
| 2,689,803 | 9/1954 | Ackerman | 117—212 X |
| 2,730,598 | 1/1956 | Lytle | 117—124 |
| 2,777,419 | 1/1957 | Paasche | 118—3 X |
| 2,960,061 | 11/1960 | Whitbeck | 118—314 X |
| 2,961,990 | 11/1960 | Wruck | 118—2 |
| 3,019,135 | 1/1962 | Orr | 117—212 X |
| 3,019,136 | 1/1962 | Auffendorde et al. | 117—212 X |
| 3,021,227 | 2/1962 | Richardson | 118—315 X |

FOREIGN PATENTS 216,620  8/1958  Australia.

JOSEPH B. SPENCER, *Primary Examiner.*

RICHARD D. NEVIUS, *Examiner.*